(12) United States Patent
Nishida (10) Patent No.: US 7,468,414 B2
(45) Date of Patent: Dec. 23, 2008

(54) MOISTURE ABSORPTIVE AND DESORPTIVE ULTRAFINE PARTICLES AND A PRODUCT USING SAID ULTRAFINE PARTICLES

(75) Inventor: Ryosuke Nishida, Setouchi (JP)

(73) Assignee: Japan Exlan Company Limited, Osaka (JP)

( * ) Notice: Subject to any disclaimer, the term of this patent is extended or adjusted under 35 U.S.C. 154(b) by 404 days.

(21) Appl. No.: 10/585,318

(22) PCT Filed: Nov. 18, 2004

(86) PCT No.: PCT/JP2004/017158

§ 371 (c)(1), (2), (4) Date: Jul. 6, 2006

(87) PCT Pub. No.: WO2005/090417

PCT Pub. Date: Sep. 29, 2005

(65) Prior Publication Data

US 2007/0185292 A1     Aug. 9, 2007

(30) Foreign Application Priority Data

Mar. 19, 2004     (JP) .............................. 2004-079591

(51) Int. Cl.
| | |
|---|---|
| C08F 8/44 | (2006.01) |
| C08F 8/12 | (2006.01) |
| C08F 220/02 | (2006.01) |
| B01J 20/26 | (2006.01) |
| F24F 3/14 | (2006.01) |

(52) U.S. Cl. .............. 525/329.7; 525/329.2; 525/329.3; 525/330.2; 525/369; 502/402; 428/500; 526/317.1; 526/319; 526/909

(58) Field of Classification Search .............. 525/329.2, 525/329.3, 329.7, 330.2, 369; 526/317.1, 526/319, 909; 502/402; 428/500

See application file for complete search history.

(56) References Cited

U.S. PATENT DOCUMENTS

| | | | |
|---|---|---|---|
| 5,691,421 A | 11/1997 | Tanaka et al. | |
| 2002/0010295 A1 | 1/2002 | Nishida | |

FOREIGN PATENT DOCUMENTS

| | | |
|---|---|---|
| EP | 0 716 882 A1 | 6/1996 |
| EP | 716882 A1 * | 6/1996 |
| EP | 1 065 222 A1 | 1/2001 |
| JP | 5-105704 | 4/1993 |
| JP | 5-132858 | 5/1993 |
| JP | 5-222350 | 8/1993 |
| JP | 8-225610 | 9/1996 |
| JP | 10-237126 | 9/1998 |
| JP | 2000-17101 | 1/2000 |
| JP | 2001-11320 | 1/2001 |
| JP | 2003-231863 | 8/2003 |

* cited by examiner

*Primary Examiner*—Roberto Rábago
(74) *Attorney, Agent, or Firm*—Wenderoth, Lind & Ponack, L.L.P.

(57) ABSTRACT

To provide moisture absorptive and desorptive ultrafine particles having high moisture absorptive and moisture desorptive properties and particularly having an excellent moisture absorptive rate and also a product using said ultrafine particles. Moisture absorptive and desorptive ultrafine particles, characterized in that, the said particles consist of a crosslinked polymer containing 1.0 to 10.0 meq/g of a salt-type carboxyl group as a polar group where an average primary particle size is not more than 0.2 μm and saturated moisture absorptive ratios at 65% RH and 90% RH at 20° C. are not less than 20% by weight and not less than 40% by weight, respectively.

8 Claims, 4 Drawing Sheets

MOISTURE ABSORPTIVE AND DESORPTIVE ULTRAFINE PARTICLES AND A PRODUCT USING SAID ULTRAFINE PARTICLES

TECHNICAL FIELD OF THE INVENTION

The present invention relates to moisture absorptive and desorptive ultrafine particles having high moisture absorptive and moisture desorptive properties and particularly having an excellent moisture absorptive rate and also to a product using said ultrafine particles.

BACKGROUND ART

As a means for removing the moisture in air, moisture absorbers having much moisture absorptive capacity and high moisture absorptive rate such as lithium chloride, calcium chloride, magnesium chloride and phosphorus pentoxide have been used. However, since those moisture absorbers have deliquescence, there are disadvantages that they are liquefied after absorption of moisture, pollute others and corrode metal, etc., have a bad shape-holding property being hard to make into a molded product, have too strong moisture absorptive property being poor in moisture desorptive property and are not able to be used repeatedly.

In the case of moisture absorbers such as silica gel, zeolite, sodium sulfate, active alumina and active carbon, they are able to be used repeatedly because they have a moisture desorptive property in addition to a moisture absorptive property whereby a part of the aforementioned problems has been solved. However, there are disadvantages therein that they have little moisture absorptive capacity, require high temperature for regeneration, are crushed and pulverized by repeated absorption and desorption of moisture and have a big specific gravity resulting in a difficulty in mixing with resin.

Apart from the inorganic ones as such, there are some cases where water absorptive resins represented by polyacrylate type are used as moisture absorbers of an organic type. However, in the case of a water absorptive resin, although a water absorptive ability for liquid water is very good, its moisture absorptive ability for moisture which is gas is low and is inferior to the aforementioned inorganic moisture absorbers. The specific problems are that a retaining property for water is high being difficult for moisture desorption, that a moisture absorptive ability is high at a nearly saturated relative humidity while a moisture absorptive ability at a relative humidity lower than that is very low, that tackiness is noted as a result of absorption of moisture, that a big change in volume happens by absorption of moisture or by absorption of water and that, as taken up as a problem at present, moisture absorptive rate is very slow. They will be due to the following reasons that the phenomena of "water absorption" and "moisture absorption" show entirely different behavior although the object is the same "water" and that, in the conventional water absorptive resins, their chemical structures are designed for an object of absorption of water whereby a moisture absorptive property is not fully achieved. Such a difference between "water absorption" and "moisture absorption" will be illustrated later.

With regard to the aforementioned problems, technique where a target is a phenomenon of "moisture absorption" has been proposed in recent years. In Japanese Patent Laid-Open No. 05/132,858, a highly moisture absorptive and desorptive fiber consisting of organic polymer is proposed while, in Japanese Patent Laid-Open No. 08/225,610, moisture adsorptive and desorptive organic ultrafine particles are also proposed and they give one solution to a problem of highly saturated moisture absorptive property. However, a moisture absorptive property within short time is not improved and a slow moisture absorptive rate has been still pointed out as a problem.

With regard to the moisture absorptive rate, a method where polyacrylate and deliquescent inorganic salt are combined is proposed in the invention of Japanese Patent Laid-Open No. 05/105,704 for example. There is mentioned that, according to said method, a product having an improved moisture absorptive ability at low humidity and having a high moisture absorptive ability without dropping the liquid is prepared. However, with regard to the moisture absorptive rate, time required for moisture absorption is in an order of hours (in Examples, a significant increase in moisture absorptive amount is available during 10 hours) and such a method is not satisfactory for the use where moisture absorptive rate is required in an order of minutes or seconds such as in the case of a rotary dehumidifier.

In order to increase the rate for moisture absorption and desorption, it is usually effective for increasing the specific surface area and, with such an object, a method where porous thing is prepared, particle size is made small, etc. has been generally used. However, when particle size is made small in the conventional material having moisture absorptive and desorptive property, a method by means of a mechanical pulverization has been mostly used. In view of pulverizing ability or trapping efficiency in making into ultrafine powder however, products which are able to be prepared in an industrial scale are limited to those having an average primary particle size in an order of 1 μm. Although there are examples of 0.4 μm and 0.3 μm for the primary particle size in Japanese Patent Laid-Open Nos. 2000/17,101 and 10/237,126, respectively, they are unable tobe taken out in a form of primary particles as they are but they are only able to be taken out in particles where they are fused and aggregated whereby, as a result, the surface area of each of them does not effectively function. There is another problem that, since only aggregates having a particle size of several tens μm are prepared, it is not possible to manufacture thin film, etc.

Further, it is usual that, when a particle size becomes smaller, cohesive force among particles due to capillary pressure becomes larger whereby fusion among particles takes place and, as a result, surface of the particle is blocked and surface area as an aggregate becomes smaller. For example, when an emulsion having a primary particle size of not more than submicronmeter is applied and dried, a very dense film is obtained because of a very small particle size. When specific surface area of the film is measured, it is usually less than 1 $m^2/g$. Thus, there is a problem that the advantage due to a surface area (calculated as not less than 50 $m^2/g$) based on the particle size of not more than submicronmeter is blocked by fusion and is unable to be achieved whereby it does not contribute in improvement in moisture absorptive rate.

In Japanese Patent Laid-Open No. 2001/11,320, there is a description for a moisture absorptive and desorptive polymer having a carboxyl group of a potassium salt type and showing an excellent moisture absorptive and desorptive rate and, although some improvements in the moisture absorptive and desorptive rate are noted, its particle size is about several μm at the smallest and it has no sufficient ability for high-leveled ones which are demanded in practical use. In Japanese Patent Laid-Open No. 2003/231,863, there is also a description exemplifying the material where moisture absorptive and desorptive fine particles are added to paint but its main constituting material is paint and the moisture absorptive and desorptive fine particles are added only as an additive. Therefore, the moisture absorptive and desorptive fine particles are covered with the paint whereby their direct contact to moisture or air for their regeneration is disturbed and it is difficult to achieve a high moisture absorptive and desorptive property.

DISCLOSURE OF THE INVENTION

Problems that the Invention is to Solve

An object of the present invention is to provide moisture absorptive and desorptive ultrafine particles having high moisture absorptive and moisture desorptive properties and being able to achieve the moisture absorptive and desorptive property within short time or, in other words, having excellent moisture absorptive and desorptive rate and also to provide a product using said ultrafine particles.

Means for Solving the Problems

The present inventors have continued intensive studies focusing their attention on moisture absorptive and desorptive property, particularly moisture absorptive and desorptive rate, of moisture absorptive and desorptive materials. As a result, they paid their attention to the fact that particle size of the moisture absorptive and desorptive materials greatly affects the moisture absorptive and desorptive rate and found that an organic polymer having excellent moisture absorptive and desorptive rate which has not been available yet is now achieved when the particle size is made less than a specific value and when cross-link which prevents the fusion by aggressive force disturbing the expression of surface functions is introduced whereupon they have achieved the present invention.

Thus, the aforementioned object of the present invention is able to be achieved by moisture absorptive and desorptive ultrafine particles which are moisture absorptive and desorptive ultrafine particles consisting of a cross-linked polymer containing 1.0 to 10.0 meq/g of a salt-type carboxyl group and 0.1 to 2.0 meq/g of the sulfonic acid group and/or salt-type sulfonic acid group as polar groups where an average primary particle size is not more than 0.1 μm and saturated moisture absorptive ratios at 65% RH and 90% RH at 20° C. are not less than 20% by weight and not less than 40% by weight, respectively.

Thus, the aforementioned object of the present invention is able to be achieved by moisture absorptive and desorptive ultrafine particles which are moisture absorptive and desorptive ultrafine particles consisting of a cross-linked polymer containing 1.0 to 10.0 meq/g of a salt-type carboxyl group as a polar group where an average primary particle size is not more than 0.2 μm and saturated moisture absorptive ratios at 65% RH and 90% RH at 20° C. are not less than 20% by weight and not less than 40% by weight, respectively.

The moisture absorptive and desorptive ultrafine particles as such are used in the fields where moisture absorptive and desorptive rate is demanded as a moisture absorptive and desorptive sheet where said particles are fixed onto a substrate, as a moisture absorptive and desorptive element where said sheet is layered and as a humidifying and dehumidifying apparatus where said element is one of the constituting elements.

Advantage of the Invention

When the moisture absorptive and desorptive ultrafine particles of the present invention are used and also when a product where said ultrafine particles are used is used, a quick moisture absorptive and desorptive rate of the present material contributes in devices, instruments and systems where dehumidification is conducted by repeated moisture absorption and desorption whereby a dehumidifying property is able to be improved and, as a result, there is achieved an advantage that efficiency is enhanced or that making the size of the device small is possible. Moreover, as a result of improvement in the property, those where much energy has been needed for moisture desorption and regeneration up to now are now able to achieve the same ability as before with less energy whereby it is now also possible to achieve the effect of conservation of energy.

EXPLANATION OF REFERENCE SIGNS IN DRAWINGS

1 moisture absorptive and desorptive sheet
2 moisture absorptive and desorptive rotor
3 motor
4 highly humid gas which is to be dehumidified
5 gas after being dehumidified
6 lowly humid gas which is to be humidified
7 gas after being humidified
8 heat source such as heater
9 fan
10 seal dividing into dehumidifying and humidifying regions
11 column where moisture absorptive and desorptive elements are filled
12 three-way valve

BEST MODE FOR CARRYING OUT THE INVENTION

The present invention will now be illustrated in detail as hereunder.

Firstly, it is necessary that the moisture absorptive and desorptive ultrafine particles of the present invention contain 1.0 to 10.0 meq/g of a salt-type carboxyl group and 0.1 to 2.0 meq/g of the sulfonic acid group and/or salt-type sulfonic acid group and consist of a cross-linked polymer or, in other words, a polymer having a cross-linking structure. Because of the existence of an appropriate cross-linking structure in the present invention, advantages of a wide surface area property due to the ultrafine particles are effectively utilized. Incidentally, the existence of the cross-linking structure is able to be confirmed by solubility in water. A salt-type carboxyl group is a polar group having a high hydrophilicity for achieving a moisture absorptive property and, when a high moisture absorptive property is aimed, it is preferred to contain said group as many as possible. However, in order to make both of the moisture absorptive rate and also the moisture absorptive amount high, an appropriate balance in terms of a proportion to the cross-linking structure is necessary. Thus, to be more specific, when the amount of the salt-type carboxyl group is too much, i.e. when it is more than 10.0 meq/g, there are resulted problems that the proportion of the cross-linking structure which is able to be introduced becomes too small and that character of the water absorptive resin becomes strong whereby tackiness is resulted as mentioned already or lowering of the moisture absorptive rate occurs. Thus, an object of the present invention is unable to be achieved. In view of the above, the amount of the salt-type carboxyl group giving a preferred result for the prevention of swelling and making into film is 9.0 meq/g or less.

On the other hand, when the amount of the salt-type carboxyl group is little, a moisture absorptive ability lowers and, especially when it is lower than 1.0 meq/g, the resulting moisture absorptive property is even inferior to the aforementioned inorganic type moisture absorbers whereby the practical value thereof is lost. When the amount of the salt-type carboxyl group is 3.0 meq/g or more, the predominance of the moisture absorptive property as compared with the currently available other moisture absorptive materials is significant whereby there are many cases of giving better result.

With regard to the type of the salt of the salt-type carboxyl group, there is no particular limitation so far as it forms a salt structure with a carboxyl group and its examples are alkali metal such as Li, Na, K, Rb and Cs, alkali earth metal such as Be, Mg, Ca, Sr and Ba, other metal such as Cu, Zn, Al, Mn, Ag, Fe, Co and Ni and organic cation such as $NH_4^+$ and amine compound. Among them, K which is particularly effective for improving the moisture absorptive and desorptive rate is more preferred. It is also possible to use two or more of the aforementioned salts together.

There is no particular limitation for a method of introducing the salt-type carboxyl group and its examples are a method where a monomer having a salt-type carboxyl group is subjected to a homopolymerization or to a copolymerization with other monomer which is able to copolymerize (method 1), a method where a polymer having a carboxyl group is prepared and then it is changed to a salt type (method 2), a method where a monomer having a functional group which is able to be induced to a carboxyl group is polymerized and said functional group in the resulting polymer is converted to a carboxyl group by means of a chemical modification followed by further converting to a salt type (method 3) and a method where the aforementioned three methods are carried out by means of a graft polymerization.

Examples of the aforementioned method 1 where a monomer having a salt-type carboxyl group is polymerized are a method where a salt-type monomer corresponding to a monomer containing carboxyl group such as acrylic acid, methacrylic acid, maleic acid, itaconic acid and vinylpropionic acid is polymerized either solely or two or more thereof are polymerized jointly, a method where a mixture of them in the same species in which one is a carboxylic acid type and another is the corresponding salt type is polymerized and a method where such a monomer is copolymerized with other monomer which is able to copolymerized therewith.

The method 2 in which a polymer having a carboxyl group is prepared and then it is converted into a salt type is, for example, a method where a homopolymer of an acid-type monomer containing a carboxyl group, a copolymer consisting of two or more thereof or a copolymer with other monomer which is able to copolymerize is prepared by means of polymerization as mentioned before and then it is converted to a salt type. There is no particular limitation for conversion of a carboxyl group to a salt type and it is possible to convert by action of a solution containing an alkali metal ion such as Li, Na, K, Rb or Cs, an alkali earth metal ion such as Be, Mg, Ca, Sr or Ba, other metal ion such as Cu, Zn, Al, Mn, Ag, Fe, Co or Ni or an organic cation such as $NH_4^+$ or amine compound to the resulting aforementioned acid-type polymer so that an ion exchange or the like is carried out.

With regard to the method 3 in which a carboxyl group is induced by a chemical modification method, there is a method where a homopolymer of a monomer, a copolymer consisting of two or more thereof or a copolymer with other monomer which is able to copolymerize containing a functional group which is able to be modified to a carboxyl group by a chemical modification treatment is polymerized and the resulting polymer is subjected to hydrolysis so that modification to a carboxyl group is carried out. When the resulting one is not a salt type, the aforementioned method for making into a salt type is applied to the modified carboxyl group. Examples of the monomer for which such a method is able to be applied are a monomer having a nitrile group such as acrylonitrile and methacrylonitrile; and anhydride, ester derivative, amide derivative, ester derivative having a cross-linking property, etc. of a monomer having a carboxylic acid group such as acrylic acid, methacrylic acid, maleic acid, itaconic acid and vinylpropionic acid.

Examples of the anhydride are maleic anhydride, acrylic anhydride, methacrylic anhydride, itaconic anhydride, phthalic anhydride, N-phenylmaleimide and N-cyclomaleimide.

Examples of the ester derivative are an alkyl ester derivative such as methyl, ethyl, propyl, butyl, pentyl, hexyl, heptyl, octyl, lauryl, pentadecyl, cetyl, stearyl, behenyl, 2-ethylhexyl, isodecyl and isoamyl; an alkyl ether ester derivative such as methoxyethylene glycol, ethoxyethylene glycol, methoxypolyethyleneglycol, ethoxypolyethyleneglycol, polyethylene glycol, methoxypropylene glycol, propylene glycol, methoxypolypropylene glycol, polypropylene glycol, methoxypolytetraethylene glycol, polytetraethylene glycol, polyethylene glycol-polypropylene glycol, polyethylene glycol-polytetraethylene glycol, polypropylene glycol-polytetraethylene glycol and butoxyethyl; an ester derivatives of a cyclic compound such as cyclohexyl, tetrahydrofurfuryl, benzyl, phenoxyethyl, phenoxypolyethylene glycol, isobornyl and neopentyl glycol benzoate; a hydroxyalkyl ester derivative such as hydroxyethyl, hydroxypropyl, hydroxybutyl, hydroxyphenoxypropyl, hydroxypropylphthaloylethyl and chloro-hydroxypropyl; an aminoalkyl ester derivative such as dimethylaminoethyl, diethylaminoethyl and trimethylaminoethyl; an alkyl ester derivative of carboxylate such as (meth)acryloyloxyethyl succinate and (meth)acryloyloxyethyl hexahydrophthalate; an alkyl ester derivative containing phosphoric acid group or phosphate group such as (meth)acryloyloxyethyl acid phosphate and (meth)acryloyloxyethyl acid phosphate;

a cross-linking alkyl ester such as ethylene glycol di(meth) acrylate, polyethylene glycol di (meth) acrylate, 1,4-butanediol di(meth)acrylate, 1,3-butanediol di (meth) acrylate, 1,6- hexanediol(meth)acrylate, 1,9-nonanediol di(meth)acrylate, trimethylolpropane tri(meth)acrylate, pentaerythritol tetra(meth)acrylate, dipentaerythritol hexa(meth)acrylate, glycerol dimethacrylate, 2-hydroxy-3-acryloyloxypropyl(meth)acrylate, di(meth)acrylate of an adduct of bisphenol A with ethylene oxide, di(meth)acrylate of an adduct of bisphenol A with propylene oxide, neopentyl glycol di(meth)acrylate, 1,10-decanediol di(meth)acrylate, dimethyloltricyclodecane di(meth)acrylate and ethylene oxide-modified trimethylolpropane tri(meth)acrylate; and a fluorinated alkyl ester derivative such as trifluoroethyl, tetrafluoropropyl, hexafluorobutyl and perfluorooctylethyl.

Examples of the amide derivative are an amide compound such as (meth)acrylamide, dimethyl (meth)acrylamide, monoethyl (meth)acrylamide, n-butyl (meth)acrylamide and tert-butyl (meth)acrylamide; etc. As to another method for introduction of a carboxyl group by a chemical modification, oxidation of alkene, alkyl halide, alcohol, aldehyde, etc. may be listed.

With regard to introduction of a salt-type carboxyl group by hydrolysis reaction of a polymer in the aforementioned method 3, there is no particular limitation as well but a known hydrolytic condition may be utilized. For example, there may be listed a method where the aforementioned monomer is polymerized and a salt-type carboxyl group is introduced into the cross-linked polymer using a basic aqueous solution of alkali metal hydroxide such as sodium hydroxide, lithium hydroxide and potassium hydroxide or ammonia and a method where a carboxylic acid group is prepared by the reaction with a mineral acid such as nitric acid, sulfuric acid and hydrochloric acid or an organic acid such as formic acid and acetic acid followed by mixing with an alkali metal salt so that a salt-type carboxyl group is introduced by means of ion exchange. Among them, a hydrolysis method using potassium hydroxide whereby a carboxyl group of a potassium salt type having an excellent moisture absorptive rate is easily prepared is preferred. The condition by which 1.0 to 10.0 meq/g is achieved is able to be decided by clarifying the relation between the amount of the salt-type carboxyl group to be introduced and the reaction factor such as reaction temperature, concentration and time by way of experiments.

There is no particular limitation for other monomer which is able to copolymerize with the aforementioned monomer being stated in the aforementioned methods for polymerization and its examples are vinyl halide compounds such as vinyl chloride, vinyl bromide and vinyl fluoride; vinyliden monomer such as vinyliden chloride, vinyliden bromide and vinyliden fluoride; unsaturated ketones such as methyl vinyl ketone, ethyl vinyl ketone, phenyl vinyl ketone, methyl isobutenyl ketone and methyl isopropenyl ketone; vinyl esters such as vinyl formate, vinyl acetate, vinyl propionate, vinyl butyrate, vinyl benzoate, vinyl monochloroacetate, vinyl dichloroacetate, vinyl trichloroacetate, vinyl monofluoroacetate, vinyl difluoroacetate and vinyl trifluoroacetate; vinyl ethers such as methyl vinyl ether and ethyl vinyl ether; acrylamide and alkyl-substituted derivatives thereof; vinyl-containing acid compounds such as vinylsulfonic acid, allylsulfonic acid, methallylsulfonic acid, styrenesulfonic acid, 2-acrylamide-2-methylpropanesulfonic acid, sulfopropyl methacrylate, vinylstearic acid and vinylsulfinic acid and salts, anhydrides and derivatives thereof; styrene and alkyl- or halo-substituted derivatives such as styrene, methylstyrene and chlorostyrene; allyl alcohol or esters or ethers thereof; vinylimides such as N-vinylphthalimide and N-vinylsuccinoimide; basic vinyl compounds such as vinylpyridine, vinylimidazole, dimethylaminoethyl methacrylate, N-vinylpyrrolidone, N-vinylcarbazole and vinylpyridine; unsaturated aldehydes such as acrolein and methacrolein; and cross-linking vinyl compounds such as glycidyl methacrylate, N-methylolacrylamide, hydroxyethyl methacrylate, triallyl isocyanurate, triallyl cyanurate and divinylbenzene.

In order to achieve a high moisture absorptive rate and to maintain a shape stability during moisture absorption in the present invention, it is necessary that the moisture absorptive and desorptive ultrafine particles are a cross-linking polymer having a cross-linking structure. There is no particular limitation for the cross-linking structure so far as that does not affect the moisture absorptive and desorptive property which is an object of the present invention and does not affect the properties of the product in which said property is utilized. Thus, any of cross-linking structure due to covalent bond, ionic cross-linking, interaction among polymer molecules or cross-linking due to crystal structure may be used. There is also no particular limitation for a method of introduction of cross-link and examples thereof are a method where cross-link is introduced by copolymerization of a cross-linking monomer in a polymerization stage of a known monomer used and a post-cross-linking method where a known monomer is firstly polymerized and, after that, a cross-linking structure is introduced by means of chemical reaction or physical energy. Among them, a method where a cross-linking monomer is used during the polymerization stage of monomer or a method where a chemical cross-linking is conducted after preparation of a polymer is particularly preferred in view of the fact that such a method is able to introduce a strong cross-link by covalent bond and is hardly affected by physical and chemical modifications as a result of moisture absorption and desorption.

In the method where a cross-linking monomer is used during a polymerization stage of a monomer, it is possible to prepare a cross-linking polymer having a cross-linking structure based on a covalent bond by copolymerization of a known cross-linking vinyl compound with a monomer having a carboxyl group or being able to convert to a carboxyl group. In that case however, it is necessary that the cross-linking monomer is such a one which is not affected or is hardly affected by an acidic condition shown by acrylic acid or the like which is a monomer or by chemical influence (such as hydrolysis) upon conversion to a carboxyl group in the polymer.

Examples of the cross-linking monomer being able to be used in the method where a cross-linking monomer is used during a polymerization stage of a monomer are cross-linking vinyl compounds such as glycidyl methacrylate, N-methylolacrylamide, triallyl isocyanurate, triallyl cyanurate, divinylbenzene, hydroxyethyl methacrylate, diethylene glycol di(meth)acrylate, triethylene glycol di(meth)acrylate, trimethylolpropane tri(meth)acrylate and methylenebisacrylamide. Among them, the cross-linking structure by triallyl isocyanurate, triallyl cyanurate, divinylbenzene and methylenebisacrylamide is chemically stable even, for example, at the stage of hydrolysis for introduction of carboxyl group which is applied to the cross-linking polymer containing the cross-linking structure and is preferred.

In addition, there is no particular limitation for a method by means of a post-cross-linking and its example is a post-cross-linking method where a hydrazine compound or formaldehyde is made to react with nitrile group in a nitrile polymer wherein the content of vinyl monomer containing nitrile group is 50% by weight or more. In particular, a method using a hydrazine compound is quite good because it is possible to introduce a strong cross-link which is stable to acid and alkali, contributes to improvement in moisture absorptive property due to the hydrophilicity of the formed cross-linking structure per se and is able to keep the form such as a porous form applied to polymer. Incidentally, with regard to the cross-linking structure obtained by the said reaction, its details have not been identified yet although it is presumed to be based upon a triazole ring or a tetrazole ring.

There is no particular limitation for the vinyl monomer having nitrile group so far as the monomer has nitrile group and its specific examples are acrylonitrile, methacrylonitrile, ethacrylonitrile, α-chloroacrylonitrile, α-fluoroacrylo-nitrile and vinylidene cyanate. Among them, acrylonitrile which is advantageous in view of the cost and has much amount of nitrile group per unit weight is most preferred.

There is no particular limitation for a method of introducing a cross-link by the reaction with a hydrazine compound so far as the aimed cross-linking structure is obtained and the method may be appropriately selected upon necessity such as concentrations of the acrylonitrile polymer and the hydrazine compound during the reaction, solvent used, reaction time and reaction temperature. With regard to reaction temperature among those, when it is too low, reaction rate becomes slow resulting in long reaction time while, when it is too high, plasticization of the starting acrylonitrile polymer takes place whereby the shape applied to the polymer may be destroyed. Therefore, the preferred reaction temperature is 50-150° C. or, more preferably, it is 80-120° C. There is also no particular limitation for the part of the acrylonitrile polymer which is to be made to react with the hydrazine compound but the polymer may be appropriately selected depending upon the use and the shape of the said polymer. To be more specific, the reaction is carried out only on the surface of the polymer, the reaction is carried out into the core area throughout, the reaction is carried out by limiting to the specific area, etc. may be appropriately selected. Examples of the hydrazine compound used here are hydrazine hydrate; hydrazine salts such as hydrazine sulfate, hydrazine hydrochloride, hydrazine nitrate, hydrazine hydrobromide and hydrazine carbonate; and hydrazine derivative such as ethylenediamine, guanidine sulfate, guanidine hydrochloride, guanidine nitrate, guanidine phosphate and melamine.

As an essential condition for enhancing the moisture absorptive and desorptive rate in the present invention, it is necessary that an average primary particle size of the moisture absorptive and desorptive ultrafine particles is 0.1 μm or smaller. The term reading an average primary particle size used here is a mean value of particle sizes in a state where the moisture absorptive and desorptive ultrafine particles are not associated or aggregated (primary particles). When said ultrafine particles are present in a solvent in a finely dispersed state or in a form of emulsion, they are completely dispersed in water and the value measured as an average particles size thereof is used.

The case where the particle size is more than 0.1 μm is not preferred in view of the following two points. (1) Specific surface area becomes small and the absorptive amount on the surface which is the most contributing factor for enhancement of moisture absorptive rate lowers. (2) Since the radius becomes large, time for movement of water molecules to the central part of the particle becomes long. Therefore, water molecules are unable to move to the central part of the particle within very short time, the central part does not contribute to the moisture absorptive rate and the inherent water absorptive ability is unable to be achieved.

Although there is no complete proportional relation between saturated moisture absorptive ratio and moisture absorption amount within short time or moisture absorptive rate, it is necessary for achieving the excellent moisture absorptive and desorptive rate and moisture absorptive and desorptive property which are objects of the ultrafine particles of the present invention that the saturated moisture absorptive ratios under 65% RH (relative humidity) and 90% RH at 20° C. are not less than 20% by weight and not less than 40% by weight, respectively. When the saturated moisture absorptive ratios under the aforementioned relative humidity are less than 20% by weight and not less than 40% by weight, respectively, the resulting fundamental property is that the moisture absorptive ability is low and, as a result, the moisture desorptive ability is inferior as well whereby the object of the present invention is unable to be achieved. Incidentally, the term reading a saturated moisture absorptive ratio used here means a moisture absorptive ratio under a saturated state at predetermined temperature and humidity.

The moisture absorptive and desorptive ultrafine particles of the present invention contain the sulfonic acid group and/or salt-type sulfonic acid group as a polar group which is other than the aforementioned salt-type carboxyl group. In addition, not only carboxylic acid group which is not a salt type of course, but also a polar group such as amino group, phosphoric acid group, salt-type phosphoric acid group, hydroxyl group, nitro group, aldehyde group, amide group, nitrile group and mercapto group may be contained together in the moisture absorptive and desorptive ultrafine particles of the present invention. Sulfonic acid group and/or salt-type sulfonic acid group (hereinafter, referred to as sulfonic acid/sulfonate group) contribute(s) in a stable production or presence of moisture absorptive and desorptive ultrafine particles in an aqueous system and are/is highly hydrophilic group(s) which are/is preferred in view of moisture absorptive property as well. Incidentally, the sulfonic acid/sulfonate group mentioned in the present invention includes a mono-substituted sulfate and a salt thereof (—O—$SO_3H$ (or M: salt)).

The amount of the sulfonic acid/sulfonate group which is contained together with the salt-type carboxyl group is 0.1 to 2.0 meq/g. When the amount of said group is less than 0.1 meq/g, ion repulsion by electric charge of the ultrafine particles in an aqueous system becomes small and, therefore, there may be the cases where the ultrafine particles are not prepared and there may also the case where it is difficult that the ultrafine particles are made to be stably present. On the other hand, when the amount of the sulfonic acid/sulfonate group is more than 2.0 meq/g, degree of hydrophilicity as a polymer becomes too high resulting in the same state as the water absorptive resin whereby there may result in the aforementioned problems. Further, the sulfonic acid/sulfonate group has less moisture absorptive amount per unit weight as compared with a salt-type carboxyl group and, therefore, there is a problem that the salt-type carboxyl group decreases while the sulfonic acid/sulfonate group increases whereby the moisture absorptive ability itself lowers.

There is also no particular limitation for the type of the salt of the sulfonic acid group so far as it forms a salt structure with a sulfonic acid group and examples thereof are alkali metal such as Li, Na, K, Rb and Cs, alkali earth metal such as Be, Mg, Ca, Sr and Ba, other metal such as Cu, Zn, Al, Mn, Ag, Fe, Co and Ni and organic cation such as $NH_4^+$ and amine compound. Among them, a potassium type which is able to coexist with a potassium-type carboxyl group which is particularly effective for enhancement of a moisture absorptive and desorptive rate is more preferred. It is also possible to use one or more of the aforementioned salt at the same time.

There is no particular limitation for a method of introduction of the sulfonic acid/sulfonate group and examples thereof are a method where a monomer containing a sulfonic acid/sulfonate group is copolymerized, a method where a sulfonic acid/sulfonate group is introduced into a polymer terminal using a initiator or a chain-transfer agent and a method where polymerization is carried out using a reactive emulsifier having a sulfonic acid/sulfonate group so that a sulfonic acid/sulfonate group is introduced into a polymer.

Examples of the monomer which is able to be used for a method of copolymerization with a monomer having a sulfonic acid/sulfonate group are vinylsulfonic acid/sulfonate, (meth)allylsulfonic acid/sulfonate, styrenesulfonic acid/sulfonate, 4-sulfobutyl (meth)acrylate and a salt thereof, methallyloxybenzenesulfonic acid/sulfonate, allyloxybenzenesulfonic acid/sulfonate, 2-acrylamido-2-methylpropanesulfonic acid/sulfonate and 2-sulfoethyl (meth)acrylate.

Another method is that an initiator which is able to generate a sulfonic acid/sulfonate radical is used and the radical is introduced as an initiator terminal. Examples of the initiator are that of a thermal decomposition type such as persulfate including ammonium persulfate, potassium persulfate, etc. With regard to an initiator of a redox type, there may be listed an initiator of a combination where a sulfonic acid/sulfonate radical is able to be generated among the combinations of an oxidizing agent such as persulfate, perchlorate, silver salt, copper salt and iron (III) salt with a reducing agent such as sulfite, hydrogen sulfite, hyposulfite, pyrosulfite, triethanolamine and iron (II) salt. With regard to the chain-transfer agent, thioglycolsulfonic acid/sulfonate may be exemplified.

In a method using a reactive emulsifier having a sulfonic acid/sulfonate group, there is no particular limitation for the reactive emulsifier which is able to be used therefor and examples thereof are 4-nonyl-2-(1-propenyl)phenoxy-polyethoxyethylsulfonic acid and a salt thereof, alkyl-alkenyl sulfo(salt) succinate, alkyl-allyloxy-(hydroxy)propyl sulfo(salt) succinate and alkyl-sulfo(salt) phenoxy-(hydroxy)propyl (meth)acrylate.

There is no particular limitation for a method of preparing the ultrafine particles of the present invention having the moisture absorptive and desorptive property but any method may be used so far as it is able to prepare the ultrafine particles having the aforementioned characteristics. For example, as a method for the preparation of the ultrafine particles of polymer, polymerization methods such as emulsion polymerization, precipitation polymerization and microemulsion polymerization may be used and, with regard to the form of polymerization, it may be either normal phase polymerization or reversed phase polymerization. Among the above, emulsion polymerization gives good results in which the latitude for selection of type and amount of emulsifiers and initiators is broad whereby more various kinds of ultrafine particles of polymer are able to be prepared.

In giving the moisture absorptive and desorptive property, a method according to reversed phase polymerization is able to directly polymerize the aforementioned monomer having a carboxyl group to give ultrafine particles having the moisture absorptive and desorptive property whereby it has an advantage of simplifying the processes. On the other hand, in a method where polymerization is conducted by a normal phase using a monomer having a functional group which is able to introduce a carboxyl group by a chemical modification and then a salt-type carboxyl group is introduced by, for example, hydrolysis into the resulting ultrafine particles, there are advantages that it is friendly to environment and the operation is easy because water is used as a solvent.

With regard to a method for the use of the moisture absorptive and desorptive ultrafine particles of the present invention, there is no particular limitation. For example, there may be listed a method where said particles are directly dried to pulverize; a method where they are fixed to an appropriate substrate such as paper, film and sheet and used as a moisture absorptive and desorptive sheet; and a method where they are used after kneading with resin, fiber, paint, etc. Among them, a method where they are used as a moisture absorptive and desorptive sheet is able to make the surface area as a molded product for moisture absorption and desorption large and, therefore, the method is effective for making the moisture absorptive and desorptive rate quick. A method where they are fixed to a substrate or kneaded is also advantageous because the problem of destabilization caused by changes in the volume due to moisture absorption and desorption of the ultrafine particles is able to be avoided as well.

The term "to fix" used here means that the moisture absorptive and desorptive ultrafine particles are fixed on a substrate and there is no particular limitation for strength of fixing and for method of fixing but various methods such as a fixation by physical means and a fixation by chemical bond may be adopted. Among them, a case where the moisture absorptive and desorptive ultrafine particles are directly bonded to a substrate or chemically bonded to a substrate via some compound is advantageous in terms of durability giving a preferred result.

There is no particular limitation for the amount of the moisture absorptive and desorptive ultrafine particles to be fixed to the substrate but an amount depending upon the actual use may be appropriately selected and fixed. However, when the amount is too much as compared with the amount of the substrate, it is not sometimes preferred because the strength of the substrate is not durable while, when it is too small, there are some cases where the moisture absorptive and desorptive characteristic which is an inherent object is not fully achieved. A specifically preferred fixed amount is 5 g/m$^2$ to 300 g/m$^2$.

There is also no particular limitation for the ratio of the moisture absorptive and desorptive ultrafine particles to the substances other than the substrate in the fixed area. However, since it is preferred that the moisture absorptive and desorptive property is enhanced as much as possible, the above ratio is preferred to be as high as possible. In the moisture absorptive and desorptive ultrafine particles of the present invention however, their hydrophilicity is very high and, when the moisture absorptive and desorptive ultrafine particles are solely fixed to a substrate, there may be the case where waterproof property is not sufficient in some uses. Therefore, it is necessary to fix in a stronger manner using the method which will be mentioned later if necessary. Even in such a case, it is preferred in view of giving an excellent moisture absorptive and desorptive property that the ratio of the moisture absorptive and desorptive ultrafine particles in the fixed area is more than 80%.

There is no particular limitation for the substrate to be fixed but it may be appropriately selected and used depending upon the actual use. Examples thereof are those having a form such as paper, nonwoven fabric, textile, knitting, molded fiber, film and sheet and the material therefor is organic or inorganic one for which there is no particular limitation. Among them, the form such as paper, nonwoven fabric or porous sheet has pores appropriately and also has uneven surfaces whereby it is able to easily fix the moisture absorptive and desorptive ultrafine particles and is also able to enhance the surface area per unit volume of the fixed area and, accordingly, it is suitable for enhancing the moisture absorptive and desorptive rate.

When the moisture absorptive and desorptive ultrafine particles are fixed, it is also possible to use a porous substance together with the moisture absorptive and desorptive ultrafine particles with an object of enhancing the moisture absorptive and desorptive rate as a moisture absorptive and desorptive sheet. With regard to the porous substance as such, that which has been commonly used may be used and examples of an inorganic type are active carbon, carbon black, graphite, carbon fiber, foamed glassy carbon, charcoal, coal, silicon carbide, silica gel, alumina, clay-type porous substance, porous glass, porous ceramic, sintered metal, Alundum, foamed concrete, pearlite, vermiculite, shirasu (a type of light gray volcanic ash), magnesia, glass fiber and ceramic fiber. Examples of an organic type are spongy or foamed ones made from a material such as polystyrene, polyvinyl chloride, polyethylene, polypropylene, polyvinyl alcohol, polyurethane, polyphenol, polyurea, polyepoxy, natural rubber, neoprene, neoprene-butylene rubber, styrene-butadiene rubber, silicone resin, polyester and acrylic resin; sintered ones consisting of polyacrylonitrile, acrylic resin, polystyrene and polyphenylene oxide; and natural high-molecular porous substances such as wood, straw, hemp palm and sponge. Among them, silica gel, zeolite, active carbon, etc. are available in various sizes, particle sizes, porosities, fine pore sizes, etc. and are advantageous due to their high adaptability.

There is also no particular limitation for a method of fixing the moisture absorptive and desorptive ultrafine particles but a commonly used method may be appropriately used. Usually, there is used a method where a solution containing the moisture absorptive and desorptive ultrafine particles is attached to or impregnated with a substrate and then a solvent, etc. are removed by drying, etc. The solvent for said solution containing the moisture absorptive and desorptive ultrafine particles may be water or an organic solvent and a mixture thereof may be used as well. There is also no particular limitation for a method where a dispersion containing the moisture absorptive and desorptive ultrafine particles is attached but a commonly used coating method may be utilized. A coating method by means of impregnation is particularly preferred as a method where the dispersion is able to be attached to both sides at the same time and surely into the central area of the substrate.

There is also no particular limitation for the strength of fixing. However, in a common use of the moisture absorptive and desorptive sheet in which the moisture absorptive and desorptive ultrafine particles are fixed, there are many cases where it is continuously used for long time by repetition of moisture absorption and desorption and, in addition, there are some cases where the fixed moisture absorptive and desorptive ultrafine particles are exposed to water due to, for example, dew condensation and it is preferred that the moisture absorptive and desorptive function is able to be achieved without detachment even under such conditions for use. In view of the above, it is preferred to use a thing where it is chemically bonded to the substrate, where it is chemically bonded via any compound, where moisture absorptive and desorptive ultrafine particles are bonded each other or where the bonded one as such is chemically bonded to the substrate as compared with a thing in which the moisture absorptive and desorptive ultrafine particles are fixed by a mere physical means.

The present inventors have also found that, in the fixation as such, another effect by making into ultrafine particles is achieved. Thus, when each of the moisture absorptive and desorptive ultrafine particles having a big particle size and the moisture absorptive and desorptive ultrafine particles according to the present invention are fixed to the substrate, it has been found that, as compared with those having a big particle size, those of the present invention are able to be strongly fixed in a small amount of a binder (a substance for bonding to the substrate) whereby durability is able to be enhanced. As a result of making the binder amount small as such in the case of the moisture absorptive and desorptive ultrafine particles, it is now possible that the ratio of the moisture absorptive and desorptive material occupying at the fixed area is made high and that higher moisture absorptive and desorptive property is achieved. The reasons for the above phenomena will be that, due to the ultrafineness of the particles, the particles upon formation of a coat are able to be filled tightly and that numbers of the points of contact of the particles per unit weight increase.

There is also no particular limitation for a method for chemical bonding of the moisture absorptive and desorptive ultrafine particles to the substrate but commonly used methods may be adopted. Among them, it is particularly preferred to adopt a method where the moisture absorptive and desorptive ultrafine particles are bonded to the substrate by using a cross-linking compound (including a polymer) having two or more functional groups having a cross-linking property in a molecule, a method where the moisture absorptive and desorptive ultrafine particles are bonded each other by using the cross-linking compound or a chemical bonding method where the above-mentioned means are combined. With regard to the functional group having a cross-linking property used here, there may be listed epoxy group, carboxyl group, hydroxyl group, methylol group, oxazoline group, amino group, aziridine group, isocyanate group and blocked isocyanate group. Among them, epoxy group, aziridine group and oxazoline group are particularly preferred since their reactivity is high and their handling is easy. Examples of a cross-linking compound having such a group are a di- or tri-glycidyl compound such as diglycidyl ether, glycerol diglycidyl ether, glycerol triglycidyl ether, ethylene glycol diglycidyl ether, propylene glycol diglycidyl ether and polyethylene glycol diglycidyl ether; a glycol compound such as ethylene glycol, propylene glycol, polyethylene glycol and glycerol; a hydroxyl group-containing compound such as glycidyl alcohol, trimethylolpropane, polyvinyl alcohol and pentaerythritol; and ethanolamine, ethylenediamine, propylenediamine, trimethylolmelamine, polyethyleneimine, urea, oxazoline-type reactive polymer and multifunctional aziridine compound. With regard to a cross-linking compound of another type, salt of multivalent metal such as magnesium, zinc, chromium and calcium may be used as well. Such a cross-linking compound may be used solely or plural types thereof may be used jointly. Although there is no particular limitation for the amount of the cross-linking compound used, it is preferred to use an amount of as little as possible since the compound tends to inhibit the moisture absorptive and desorptive ability. Practically, it is appropriate to use 0.1 to 20.0% by weight or, more preferably, 1.0 to 10.0% by weight to the moisture absorptive and desorptive ultrafine particles.

As to another method for a chemical bonding of the moisture absorptive and desorptive ultrafine particles to a substrate, a method where a polymerizing compound is used and polymerized so as to bond to a substrate also gives a good result. It is believed that, in this method, covalent bond strongly bonds between the substrate and the moisture absorptive and desorptive ultrafine particles by means of a graft polymerization where a substrate is a starting point or by means of a graft polymerization where the moisture absorptive and desorptive ultrafine particles are starting points. Even when there is no direct bond between the substrate and the moisture absorptive and desorptive ultrafine particles, the substrate and the moisture absorptive and desorptive ultrafine particles or the moisture absorptive and desorptive ultrafine particles each other may be strongly trapped by a network formed by polymerization whereupon fixation to the substrate takes place.

With regard to an actual method for the fixation using the polymerizing compound, there may be exemplified a method where a mixture of moisture absorptive and desorptive ultrafine particles, polymerizing compound and polymerization initiator is applied to a substrate and the polymerizing compound is polymerized and fixed upon removal of the solvent such as drying; a method where a solvent is once removed after the application and then a polymerizing compound is polymerized; and a combined method where a chemical bonding is conducted using the aforementioned cross-linking compound and then a polymerizing compound is polymerized. Incidentally, in conducting those methods, the aforementioned porous substance may be used at the same time.

Examples of the polymerizing compound which is able to be used for the methods as such are a monomer used for introduction of a carboxyl group and a monomer which was previously exemplified as a monomer being able to be copolymerized or a cross-linking monomer. Among them, that having a functional group which has a high affinity to or has reactivity with moisture absorptive and desorptive ultrafine particles such as epoxy group, carboxyl group and hydroxyl group is particularly preferred. Although there is no particular limitation for the amount of the polymerizing compound used, it is preferred to use an amount of as little as possible since the compound tends to inhibit the moisture absorptive and desorptive ability. Practically, it is appropriate to use 0.1 to 20.0% by weight or, more preferably, 1.0 to 10.0% by weight to the moisture absorptive and desorptive ultrafine particles.

With regard to a method for polymerization of a polymerizing compound, there is no particular limitation but a polymerization method which is able to be commonly used may be used. Among them, a method where an initiator of a thermal decomposition type in which the heat during drying of an already-applied sheet is able to be effectively utilized or an initiator of a redox type is used for polymerization and a method where energy ray such as electronic ray and ultraviolet ray is used gives a good result.

Examples of the initiator of a thermal decomposition type are a peroxide-type initiator such as benzoyl peroxide, di-tert-butyl peroxide, diisopropyl peroxydicarbonate, 2,4-dichlorobenzoyl peroxide, lauroyl peroxide, cyclohexanone peroxide, tert-butyl perbenzoate, dicumyl peroxide, di-tert-butyl peroxide, p-menthane hydroperoxide, pinan hydroperoxide, cumene hydroperoxide, acetyl peroxide, potassium persulfate and ammonium persulfate; and an azo-type initiator such as azobisisobutyronitrile, methyl azobisisobutyrate, azobis-2,4-dimethylvaleronitrile, azobiscyclohexane carbonitrile, azobisisobutylamidine hydrochloride and 4,4'-azobis-4-cyanovaleric acid.

Examples of the initiator of a redox type are combinations of cumene hydroperoxide or dialkyl peroxide with amine, polyamine or iron salt; hydrogen peroxide with ammonia, ethylamine or iron salt; potassium persulfate or ammonium persulfate with sodium sulfite, sodium hydrogen sulfite, triethanolamine or iron salt; sodium perchlorate with sodium sulfite; and cerium sulfate with alcohol, amine or starch.

In a method where energy ray such as electronic ray or ultraviolet ray is used, a commonly used sensitizer may be used. Its examples are a carbonyl compound such as acetone, biacetyl, benzyldimethylketal, benzoin, benzanthrone, benzophenone, cyclohexanone and acetylacetone; a sulfur compound such as thiophenol, thiocresol, 2-mercaptobenzimidazole, mercaptobenzoxazole, mercaptobenzthiazole, methyl dithiocarbamate, diphenyl sulfide, diphenyl disulfide, dibenzoyl disulfide, dibenzthiazoyl disulfide, tetraalkylthiuram sulfide, tetraalkylthiuram disulfide, thioxanthone, 2-isopropylthioxantone and 2,4-diethylthioxanthone; a halogen compound such as bromopropane, chlorocyclohexane and chloromethylnaphthalene; an amino compound such as triethylamine, diethylamine, diethanolamine, ethanolamine, dimethylaminobenzoic acid and methyl dimethylaminobenzoate; a known peroxide or azobis compound; and a dye-type sensitizer such as rhodamine, erythrosine, acrylflavin, riboflavin, eosin, fluorescein, isocyan, pinacyanol halide and cryptocyanine. If necessary, the aforementioned initiator of a thermal decomposition type or that of a redox type may be compounded therewith.

In the aforementioned fixing method, an additive may be used if necessary provided that the moisture absorptive and desorptive characteristic of the present invention which is an object of the present invention is not significantly lowered. Thus, various kinds of thermal polymerization inhibitor, leveling agent, thickener, viscosity-lowering agent, thixotropy-giving agent, halation inhibitor, delustering agent, coloring pigment, diluent, filler, enriching agent and thermoplastic resin, etc. may be appropriately selected and used.

There is no particular limitation for the form of the aforementioned moisture absorptive and desorptive sheet used but it is possible to use a sheet form as it is or to use after subjecting to a molding process. Among them, a method where a moisture absorptive and desorptive element prepared by layering of moisture absorptive and desorptive sheets gives a good result as a method where a high moisture absorptive and desorptive rate which is a characteristic of the moisture absorptive and desorptive ultrafine particles is able to be utilized. With regard to the form of said layering, it is possible to adopt a molding by which a contacting area with vapor participating in moisture absorption and desorption is able be made wide and a pressure loss is also able to be made low and that is practically advantageous as well. Here, the term "layering" stands for a state where the moisture absorptive and desorptive sheets as they are or after being molded are layered under such a state that there are many pores which are able to pass gas such as vapor which is an object for moisture absorption and desorption or air which is a medium. The case where a material other than the moisture absorptive and desorptive sheet is contained either in a sheet form or a molded form during said layering is also covered within the term "layering" of the present invention.

Figure 1:
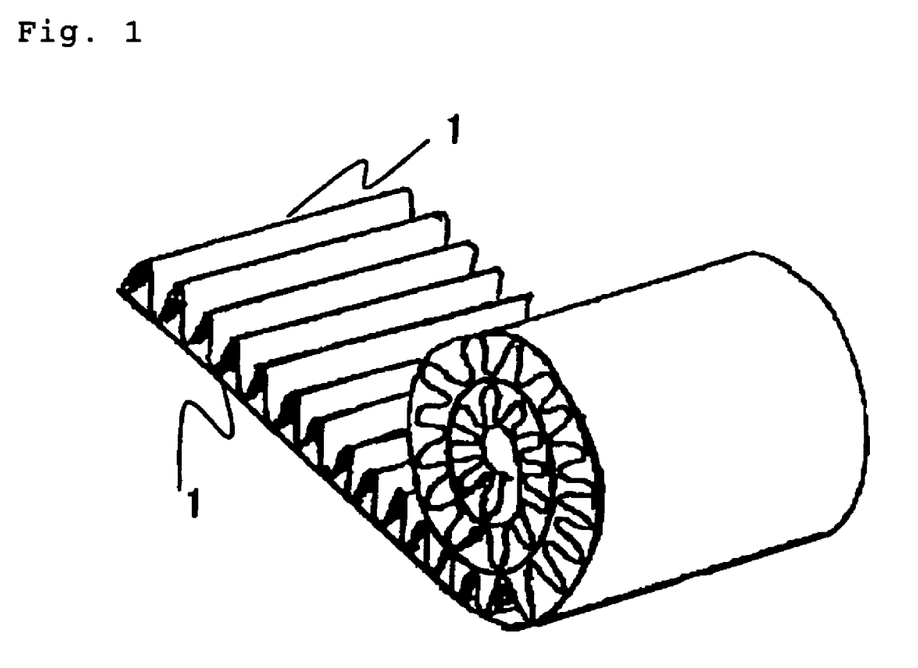
FIG. 1 is a one-side corrugated sheet comprising the moisture absorptive and desorptive sheet of the present invention.
Figure 2:
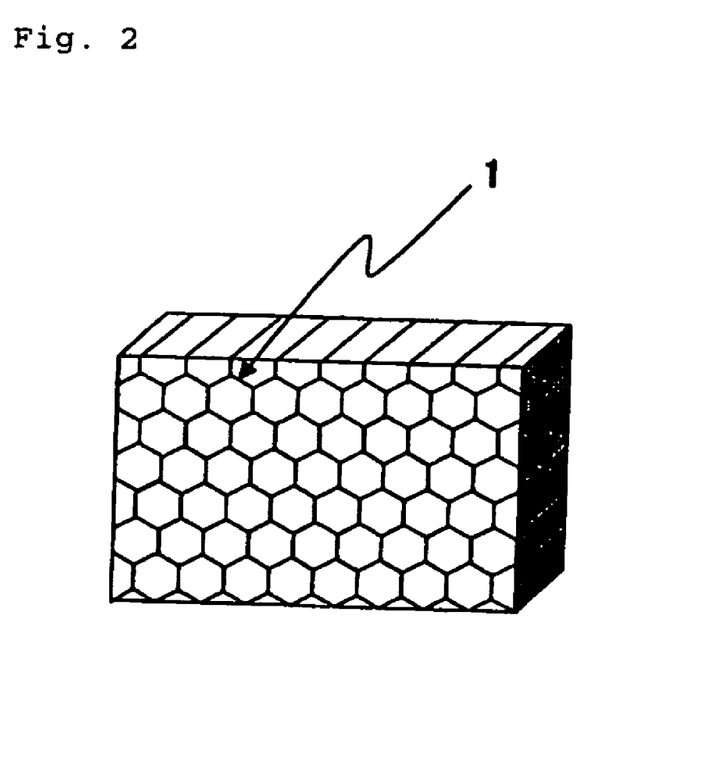
FIG. 2 is a honeycomb-type moisture absorptive and desorptive element comprising the moisture absorptive and desorptive sheet of the present invention.

Specific examples of the layering are a corrugated form (wavy form) comprising the moisture absorptive and desorptive sheets as being exemplified in FIG. 1, a honeycomb type (tetragon, hexagon, octagon, etc.) as being exemplified in FIG. 2 and a rolled core type (pseudo-circular shape). In a corrugated form, its production is in such a manner that a moisture absorptive and desorptive sheet is continuously bent to prepare a sheet having many continued peaks and valleys and then bottoms of the valleys of the aforementioned bent sheet are adhered or fused onto the surface of another flat sheet. The resulting one-side corrugated sheet is further layered or is wound in a roll form whereupon a molded product having many pores is prepared and used. With regard to the aforementioned sheet to bend and the flat sheet, both may be moisture absorptive and desorptive sheets or only one of them may be a moisture absorptive and desorptive sheet.

The size of the wave of said corrugated product may be appropriately selected in view of the relation with the moisture absorptive and desorptive property and the pressure loss depending upon the actual use. As to the usual size, that where height is 10 mm or less and width is 20 mm or less is often used. When a higher moisture absorptive and desorptive property is demanded, that where the size of waves is small is preferred and a product in which height is 0.5 to 5 mm and width is 0.5 to 10 mm often gives a good result.

Figure 3:
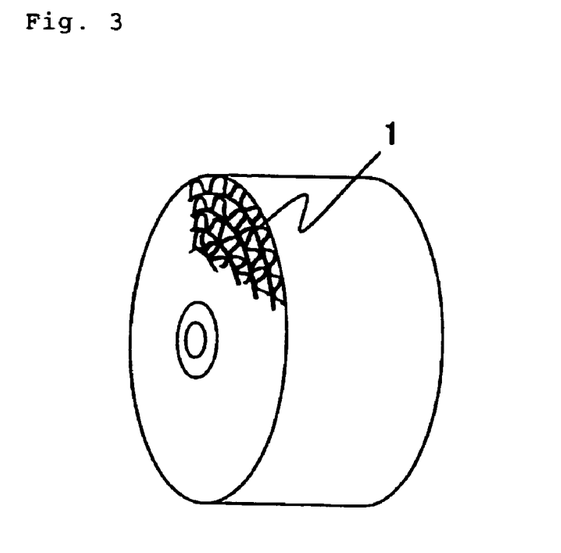
FIG. 3 is a moisture absorptive and desorptive rotor being formed from the corrugated-form moisture absorptive and desorptive element comprising the moisture absorptive and desorptive sheet of the present invention.
Figure 4:
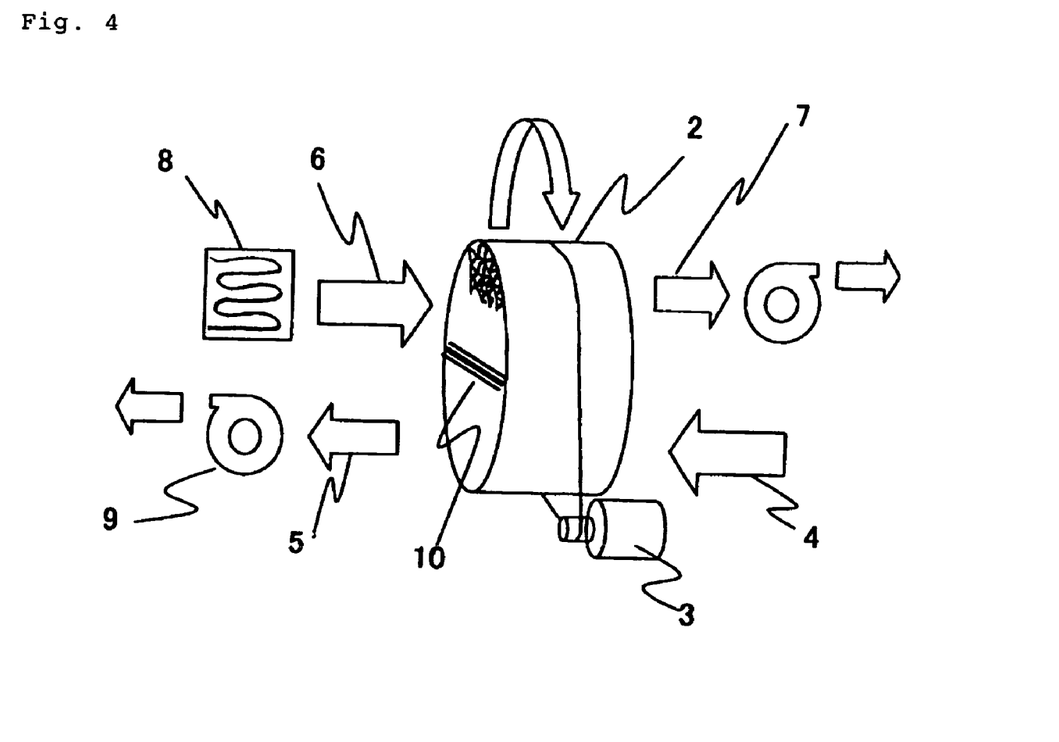
FIG. 4 is a humidifying/dehumidifying apparatus using the moisture absorptive and desorptive rotor comprising the absorptive and desorptive sheet of the present invention.

There is no particular limitation for actual examples of the use of a moisture absorptive and desorptive element comprising the moisture absorptive and desorptive sheets of the present invention and it is able to be used, for example, as an apparatus for dehumidification and humidification actively utilizing the moisture absorptive and desorptive property and a heat pump utilizing the heat generation as a result of humidification and the heat absorption as a result of dehumidification. With regard to a humidifying and dehumidifying apparatus (humidifying/dehumidifying apparatus), it has the moisture absorptive and desorptive element comprising the aforementioned layered product as one of the constituting elements and an example of the present apparatus is an apparatus having the so-called humidity-adjusting function in which a rotor for humidification and dehumidification comprising the aforementioned moisture absorptive and desorptive sheets is used as shown in FIG. 3, a system as shown in FIG. 4 comprising a motor which rotates said rotor, an air blowing or sucking means comprising fan and duct for blowing or sucking the air to said rotor and heat source for regeneration or low-humidity air source is used for dehumidification or humidification by the same structure as before whereby a place is able to be kept at a constant humidity.

Figure 5:
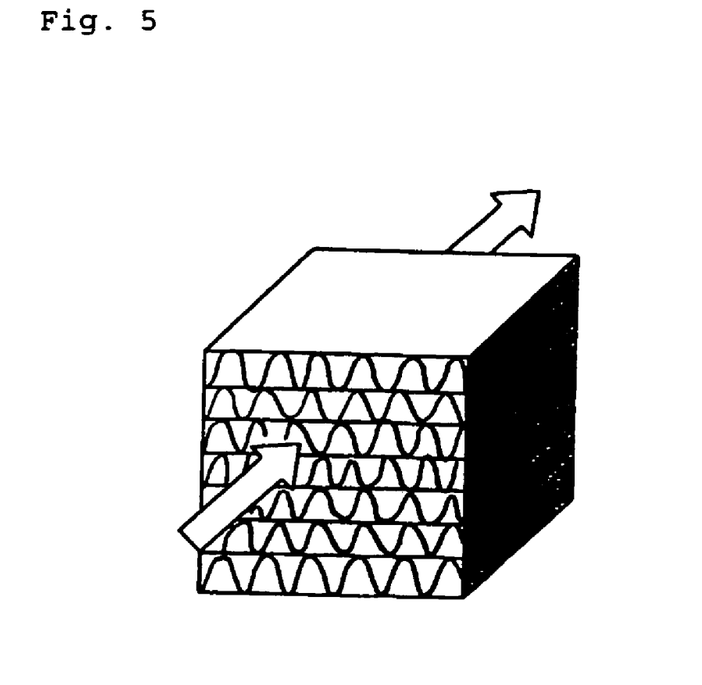
FIG. 5 is a moisture absorptive and desorptive element where the one-side corrugated sheet comprising the moisture absorptive and desorptive sheet of the present invention is layered in such a manner that ventilation direction is same.
Figure 6:
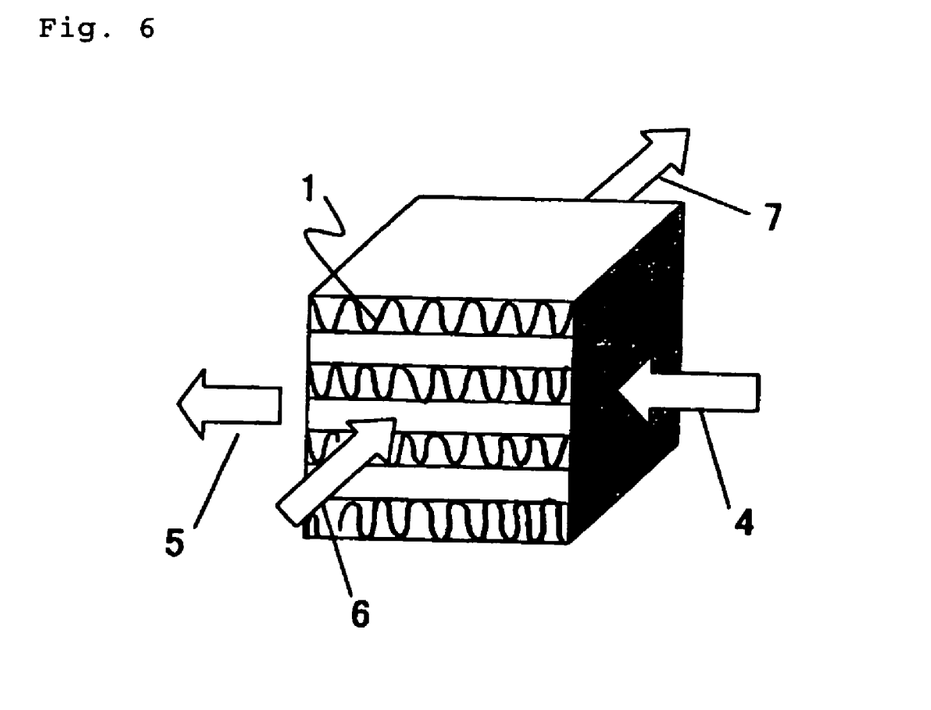
FIG. 6 is a moisture absorptive and desorptive element where the one-side corrugated sheet comprising the moisture absorptive and desorptive sheet of the present invention is layered in such a manner that ventilation direction is different.
Figure 7:
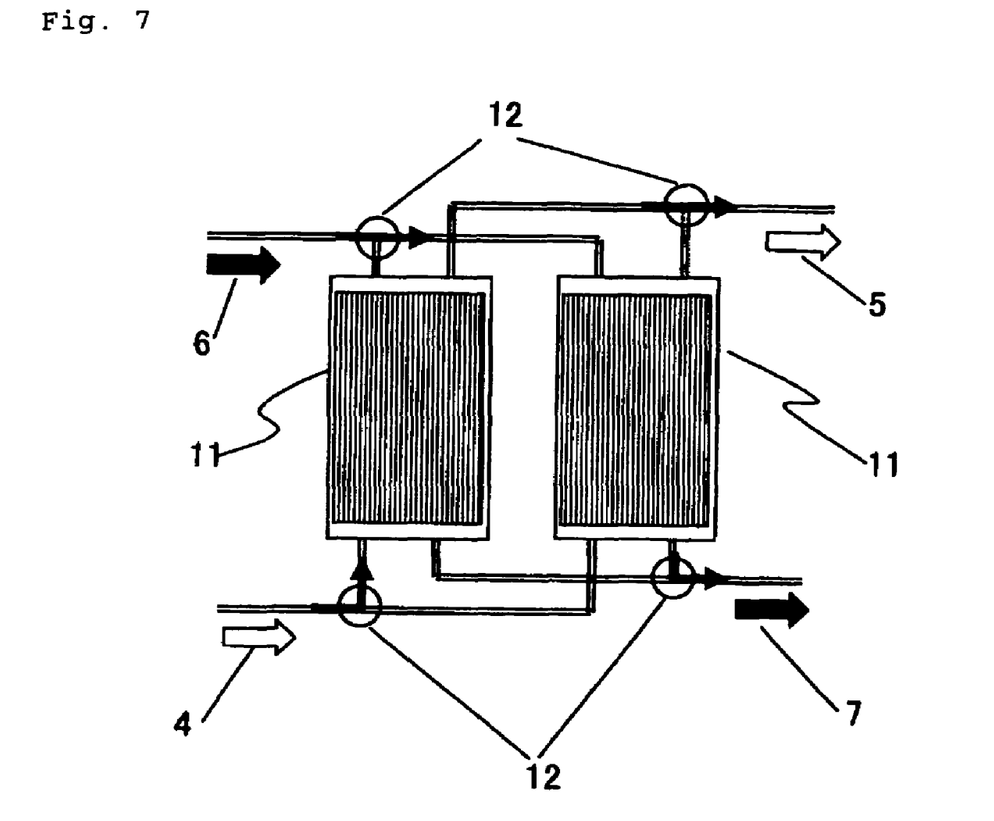
FIG. 7 is a humidifying/dehumidifying apparatus of batch change type using the moisture absorptive and desorptive element of the present invention being layered in such a manner that ventilation direction is same.

Other specific examples are a moisture absorptive and desorptive element where the aforementioned one-side sheets are arranged in the same direction as shown in FIG. 5 and that where they are layered in the different directions as shown in FIG. 6. In the former case, it is an apparatus where humidification and dehumidification are carried out one after another by a batch system as shown in FIG. 7 whereby adjustment of humidity is conducted by means of humidification and dehumidification. In the latter case, it is an apparatus where gas materials having different humidity are passed from a different direction of each pore whereby humidification and dehumidification take place in each of the moisture absorptive and desorptive element sheets and transfer of humidity or, in other words, latent heat reaction takes place and, as a result, humidification or dehumidification is able to be carried out.

EXAMPLES

The present invention will now be specifically illustrated by way of the following examples although the present invention is not limited to those examples. Unless otherwise mentioned, the terms "part(s)" and "%" used in the Examples are those by weight. First, method for evaluating the characteristics and the way of expressing the evaluated result will be illustrated.

Firstly, evaluation of the moisture absorptive ability is carried out in terms of a saturated moisture absorptive ratio and a two-minute moisture absorptive amount which stands for a moisture absorptive rate. The saturated moisture absorptive ratio is a value obtained by the following method. The moisture absorptive and desorptive ultrafine particles in an emulsion form is applied by impregnating with a substrate paper and dried by hot air of 105° C. and the resulting sheet is used as a sample for the measurement of a moisture absorptive ability. In conducting the measurement, about 1.0 g of said sheet is firstly dried with a hot-air drier at 105° C. for 16 hours and weight of the sample is measured (Wds (g)). Then the sample is allowed to stand for 24 hours in a constant-temperature and constant-humidity chamber where temperature is adjusted at 20° C. and relative humidity is adjusted to 65% RH or 90% RH and weight of the moisture-absorbed sample is measured (Wws (g)). The same operations are also conducted for the paper which is a substrate for impregnation and the resulting weights are called Pds and Pws. On the basis of the above results, a saturated moisture absorptive ratio is calculated from the following formula.

$$\text{Saturated moisture absorptive ratio (\% by weight)} = \{[(Wws-Wds)-(Pws-Pds)]/(Wds-Pds)\} \times 100$$

With regard to the saturated moisture absorptive ratio of the moisture absorptive and desorptive ultrafine particles themselves, the absolutely dried moisture absorptive and desorptive ultrafine particles are finely pulverized using a mortar and the resulting dry fine powder is used as a sample for the measurement. Said powder (about 1.0 g) is dried by a hot-air drier at 105° C. for 30 minutes and its weight is measured (Wd (g)). Then the sample is allowed to stand for 16 hours in a constant-temperature and constant-humidity chamber where temperature is adjusted at 20° C. and relative humidity is adjusted to 65% RH or 90% RH and weight of the moisture-absorbed sample is measured (Ww (g)). On the basis of the above value, calculation is conducted by the following formula.

$$\text{Saturated moisture absorptive ratio (\% by weight)} = \{(Ww-Wd)/Wd\} \times 100$$

Method for the measurement of the two-minute moisture absorptive amount is as follows. Firstly, a sample to be measured is prepared by the following method. An emulsion solution containing about 10% by weight of the moisture absorptive and desorptive ultrafine particles is applied to paper having a thickness of about 200 µm by means an impregnation application method so as to make the moisture absorptive and desorptive ultrafine particles about 50 g/m² and then dried with a hot air of 120° C. to prepare the paper having a moisture absorptive and desorptive ability. After that, said paper is subjected to a one-side corrugating process under the condition of 3.4 mm cell pitch width and 1.7 mm cell height, the resulting corrugated product is wound into a cylindrical shape where diameter of the opening is 38 mm and length is 200 mm so that air flows in the longitudinal direction and the resulting molded product is used as a sample for the measurement. Then, with regard to the measurement of said sample, it is firstly subjected to a drying treatment under the condition of 65° C. and an absolute humidity of 14 g/kg-dry air. When it is confirmed that there is no more change in weight under said condition, the drying treatment is finished and the weight at that time is defined as a dry weight (Wd1 (g)). After that, humidification is carried out in such a manner that air of 27° C. with an absolute humidity of 11 g/kg-dry air is passed through the corrugated paper in the longitudinal direction of the corrugated paper at a surface air speed of 2 m/sec at the cross section (38 mm diameter) of the opening of the molded product. The moisture-absorbing operation is conducted for 2 minutes and weight after said 2 minutes is measured and is defined as a wet weight (Ww1 (g)). Difference between the resulting wet weight (Ww1 (g)) and dry weight (Wd1 (g)) is defined as a two-minute moisture absorptive amount.

On the other hand, the moisture desorptive rate is evaluated by a moisture desorbed amount during two minutes. Thus, a moisture-absorbing treatment is carried out under the conditions of at 27° C. and an absolute humidity of 11 g/kg-dry air. When it is confirmed that there is no more change in weight under said conditions upon saturated moisture absorption, the moisture-absorbing treatment is finished and the weight at that time is defined as a wet weight (Ww2 (g)). After that, drying is carried out in such a manner that air of 65° C. with an absolute humidity of 14 g/kg-dry air is passed through the corrugated paper in the longitudinal direction of the corrugated paper at a surface air speed of 2 m/sec at the cross section (38 mm diameter) of the opening of the molded product. The drying treatment is conducted for 2 minutes and weight after said 2 minutes is measured and is defined as a dry weight (Wd2 (g)). Difference between the resulting dry weight (Wd2 (g)) and wet weight (Ww2 (g)) is defined as a two-minute moisture desorptive amount. In both cases of moisture absorptive and desorptive rates, the more the two-minute moisture absorptive and desorptive amounts, the higher the moisture absorptive and desorptive rates.

Average particle size of the particles is measured with water as a dispersing medium by using a particle size distribution measuring device of a laser diffraction type (ELS-800 manufactured by Otsuka Electronics).

With regard to the amount of a salt-type carboxyl group, 1 g of a well-dried sample is precisely weighed (X (g)), 200 ml of water is added thereto, 1N aqueous solution of hydrochloric acid is added under warming at 50° C. to adjust to pH 2 so that all carboxyl groups contained in the sample are made into those of an H type and then a titration curve is determined according to a conventional method using 0.1N NaOH aqueous solution. From said titration curve, amount of the NaOH solution (Y (ml)) consumed for the carboxyl groups of an H type is determined and then the total carboxyl group amount contained in the sample is calculated by the following formula.

(Total carboxyl group amount meq/g)=0.1 $Y/X$

In the meanwhile, a titration curve is similarly determined without adjusting to pH 2 by addition of 1N aqueous solution of hydrochloric acid during the aforementioned operation for the measurement of the amount of the total carboxyl group and the amount of a carboxyl group of an H type contained in the sample is measured. From those results, amount of the carboxyl group of a salt type is calculated by the following formula.

(Amount of the carboxyl group of a salt type meq/g)= (total carboxyl group amount)−(amount of a carboxyl group of an H type)

With regard to a quantitative determination of sulfonic group, concentration of sulfur is quantified by elementary analysis and, from the result thereof, amount of sulfonic acid group is calculated.

Detaching ratio due to running water is measured as follows. A moisture absorptive and desorptive sheet in a size of 9 cm×21 cm to which the moisture absorptive and desorptive material is applied is dried at 105° C. for 30 minutes and then dry weight is measured. Then said sheet is hung in a 10-liter container fully filled with water and 2 liters/minute of water is flown into the container during 1 hour and is overflowed whereupon the moisture absorptive and desorptive sheet is exposed to running water. After 1 hour, the sheet after treating with running water is dried at 105° C. for 30 minutes and its weight is measured. Percentage of the value calculated by dividing the difference between the weights before and after the treatment by the weight before the treatment is defined as a detaching ratio due to running water. This value is a numeral showing the waterproof property of the moisture absorptive and desorptive sheet and, when the value is smaller, the waterproof property is judged to be higher.

Example 1

400 parts of Acrylonitrile (AN), 40 parts of methyl acrylate (MA), 100 parts of divinylbenzene (DVB), 26 parts of sodium p-styrenesulfonate (SPSS) and 1181 parts of water were charged in a 2000-ml autoclave, then di-tert-butyl peroxide as an initiator for polymerization was added in an amount of 0.5% to the total amount of the monomers and, after being tightly closed, the mixture was polymerized with stirring at 160° C. for 10 minutes. After completion of the reaction, the mixture was cooled down to room temperature with a continuous stirring and the polymerized product was taken out from the autoclave. The product was a polyacrylonitrile-type cross-linked polymer in an emulsion form having very fine particle size where an average particle size was 0.06 μm and concentration of the polymer was 27%.

To 370 parts of the resulting polyacrylonitrile-type cross-linked polymer in an emulsion form were added 45 parts of potassium hydroxide and 590 parts of water and the reaction was carried out at 95° C. for 36 hours whereby nitrile group and methyl ester group were hydrolyzed to convert to carboxylic acid group (potassium salt type at the stage where the hydrolysis reaction was finished). The resulting hydrolyzed solution was placed in a semipermeable membrane of cellulose and dipped in deionized water to desalt to give the moisture absorptive and desorptive ultrafine particles of the present invention in an emulsion form. Characteristics of the resulting moisture absorptive and desorptive ultrafine particles are as shown in Table 1 and the saturated moisture absorptive ratio was so good that it was 56% at 20° C.×65% RH and 98% at 20° C.×90% RH. It was also confirmed that the two-minute moisture absorptive amount and desorptive amount were as high as 1.4 and 1.5, respectively (high moisture absorptive and desorptive rate).

Example 2

The moisture absorptive and desorptive ultrafine particles of the present invention were prepared by the same formulation as in Example 1 except that the reaction time for hydrolysis was changed to 4 hours. Characteristics of the resulting moisture absorptive and desorptive ultrafine particles are as shown in Table 1 and, as compared with Example 1, the saturated moisture absorptive ratio was a bit low probably due to the fact that the amount of the salt-type carboxyl group was as low as 4.5 meq/g. However, lowering in the two-minute moisture absorptive and desorptive amounts was rarely noted and an excellent moisture absorptive and desorptive rate was achieved.

Example 3

The moisture absorptive and desorptive ultrafine particles of the present invention of a sodium salt type was prepared by the same formulation as in Example 1 except that the hydrolysis reaction was conducted using sodium hydroxide instead of potassium hydroxide. The saturated moisture absorptive ratio was higher than that in Example 1 having a high moisture absorptive ability. However, the two-minute moisture absorptive and desorptive amounts were low as compared with Example 1. That is probably due to the fact that the salt type of the carboxylic acid was sodium.

Example 4

450 parts of Acrylonitrile (AN), 40 parts of methyl acrylate (MA), 45 parts of sodium p-styrenesulfonate (SPSS) and 1181 parts of water were charged in a 2000-ml autoclave, then di-tert-butyl peroxide as an initiator for polymerization was added in an amount of 0.5% to the total amount of the monomers and, after being tightly closed, the mixture was polymerized with stirring at 160° C. for 10 minutes. After completion of the reaction, the mixture was cooled down to room temperature with a continuous stirring and the polymerized product was taken out from the autoclave. The product was a polyacrylonitrile-type polymer in an emulsion form having very fine particle size where an average particle size was 0.04 μm and concentration of the polymer was 28%.

370 parts of the resulting polyacrylonitrile-type polymer in an emulsion form were mixed with 50 parts of 60% hydrazine and 850 parts of water and subjected to a hydrazine treatment at 90° C. for 16 hours to introduce a cross-link. Further, 100 parts of potassium hydroxide was added thereto and the reaction was conducted at 95° C. for 36 hours whereupon the residual nitrile group was hydrolyzed to convert to carboxylic acid group (potassium salt type at the stage where the hydrolysis was finished). The resulting hydrolyzed solution was placed in a semipermeable membrane of cellulose and dipped in deionized water to desalt to give the moisture absorptive and desorptive ultrafine particles of the present invention by an after-cross-linking method in an emulsion form. Characteristics of the resulting moisture absorptive and desorptive ultrafine particles are as shown in Table 1. Due to the after-cross-linking, nitrile group which is the origin of carboxyl group was used and, therefore, amount of carboxyl group was a bit low although a saturated moisture absorptive ratio and moisture absorptive and desorptive rate were sufficient.

Example 5

1 part of Sodium laurylsulfate, 3 parts of ammonium persulfate and 350 parts of deionized water were placed in a reaction vessel, the reaction vessel was heated up to 70° C. and 35 parts of methyl acrylate (referred to as MA), 40 parts of butyl acrylate, 15 parts of divinylbenzene, 5 parts of methacrylic acid, 5 parts of sodium p-styrenesulfonate, 3 parts of polyethylene glycol (23 mol) monoacrylate and 50 parts of deionized water were dropped thereinto keeping the temperature at 70° C. with stirring to start the polymerization. Dropping rate was adjusted so that dropping of those monomers finished within 30 minutes and polymerization was conducted keeping the same condition for 2 hours after completion of the dropping. The resulting polymer emulsion was very fine where solid content was 21% and an average particle size was 0.03 μm.

To 480 parts of the resulting polymer emulsion was added a solution where 45 parts of potassium hydroxide was dissolved in 475 parts of deionized water and the mixture was subjected to a hydrolysis reaction at 95° C. for 48 hours and for 8 hours more under a refluxing condition. The mixed solution after the hydrolysis was placed in a semipermeable membrane of cellulose and dipped in deionized water to desalt to give the moisture absorptive and desorptive ultrafine particles of the present invention in an emulsion form by means of a method for introduction of carboxylic acid by way of hydrolysis of ester. Characteristics of the resulting moisture absorptive and desorptive ultrafine particles are as shown in Table 1. Thus, an average particle size was as very small as 0.04 μm and a saturated moisture absorptive ability and a moisture absorptive and desorptive rate were excellent.

Comparative Example 1

The same method as in Example 1 was conducted except that the hydrolyzing condition was changed to at 70° C. for 4 hours to prepare ultrafine particles. Characteristics of the resulting ultrafine particles are shown in Table 1. Since the hydrolyzing condition was mild, content of the carboxylic acid group was very little. As a result, a saturated moisture absorptive ability was low and a two-minute moisture absorptive and desorptive amount was very little whereby the product was unable to be practically used.

Comparative Example 2

550 parts of Acrylonitrile (AN), 40 parts of methyl acrylate (MA), 20 parts of divinylbenzene (DVB), 26 parts of sodium p-styrenesulfonate (SPSS) and 1181 parts of water were charged in a 2000-ml autoclave, then di-tert-butyl peroxide as an initiator for polymerization was added in an amount of 0.5% to the total amount of the monomers and, after being tightly closed, the mixture was polymerized with stirring at 160° C. for 10 minutes. After completion of the reaction, the mixture was cooled down to 90° C. with a continuous stirring and the polymerized product was taken out from the autoclave. The product was a polyacrylonitrile-type cross-linked polymer in an emulsion form having very fine particle size where an average particle size was 0.05 μm and concentration of the polymer was 29%.

To 370 parts of the resulting polyacrylonitrile-type cross-linked polymer in an emulsion form were added 45 parts of sodium hydroxide and 590 parts of water and the reaction was carried out at 95° C. for 36 hours whereupon nitrile group and methyl ester group were hydrolyzed to convert to carboxylic acid group (sodium salt type at the stage of completion of the hydrolysis reaction). Since the product obtained after the reaction was in a gel state, 500 parts of water was further added to make into a suspension state of the gel. The resulting product in a suspension state was placed in a semipermeable membrane of cellulose and dipped in deionized water to desalt. Result of the evaluation of the characteristics of the product is as shown in Table 1. Thus, although moisture absorptive property under high humidity was high, a moisture absorptive property at 20° C. and 65% RH was low and the two-minute moisture absorptive and desorptive amount was also very little whereby the product was unable to be practically used. In addition, due to its gel state, correct measurement of its average particle size was not possible.

Comparative Example 3

Moisture absorptive and desorptive fine particles were prepared by the same method as in Example 1 except that the amount of sodium p-styrenesulfonate (SPSS) was changed to 16 parts. Characteristics of the resulting fine particles are as shown in Table 1 and the average particle size was 0.4 μm and was larger than that of the present invention. A saturated moisture absorptive ratio showed a high value and, when much time was applied, the resulting moisture absorptive ability was good. However, the two-minute moisture absorptive and desorptive amount was low as compared with the product of Example 1 and the moisture absorptive and desorptive property was inferior whereby that was not a sufficient property when a practical use was taken into consideration.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Amount of a salt-type carboxyl group | [meq/g] | 7.9 | 4.5 | 9.1 | 6 | 7.3 | 0.8 | 10.2 | 8.0 |
| Salt type | — | K | K | Na | K | K | K | Na | K |
| Amount of sulfonic acid group | [meq/g] | 0.13 | 0.13 | 0.14 | 0.21 | 0.19 | 0.21 | 0.11 | 0.08 |
| Average particle size | [μm] | 0.08 | 0.07 | 0.08 | 0.1 | 0.04 | 0.06 | — | 0.4 |
| Saturated moisture absorptive ratio | 20° C. × 65% RH [%] | 56 | 30 | 60 | 48 | 53 | 11 | 18 | 54 |
|  | 20° C. × 90% RH [%] | 98 | 62 | 102 | 88 | 96 | 34 | 168 | 99 |
| Two-minute moisture absorptive amount | [g] | 1.4 | 1.2 | 0.7 | 1.0 | 1.3 | 0.2 | 0.1 | 0.4 |
| Two-minute moisture desorptive amount | [g] | 1.5 | 1.4 | 0.8 | 1.2 | 1.5 | 0.2 | 0.2 | 0.5 |

Example 6

To 100 parts of the emulsion containing 10% by weight of the moisture absorptive and desorptive ultrafine particles prepared in Example 1 was added 0.5 part of ethylene glycol diglycidyl ether and mixed with stirring at room temperature. Said mixed solution was used and applied by impregnation with substrate paper having a basis weight of 45 g/m² and dried at 120° C. to give the moisture absorptive and desorptive sheet of the present invention to which the moisture absorptive and desorptive component of 70 g/m² in terms of a solid was fixed. Characteristics of said sheet are as shown in Table 2. Although the saturated moisture absorptive ratio was somewhat lower than that of the starting moisture absorptive and desorptive ultrafine particles, the product still maintained a high property and its waterproof property judged from the detaching ratio due to running water was excellent as well.

Example 7

To 100 parts of the emulsion containing 10% by weight of the moisture absorptive and desorptive ultrafine particles prepared in Example 1 was added 0.5 part of acrylic acid and 0.02 part of ammonium persulfate, and mixed with stirring at room temperature. Said mixed solution was used and applied by impregnation with substrate paper having a basis weight of 45 g/m² and dried at 120° C. to give the moisture absorptive and desorptive sheet of the present invention to which the moisture absorptive and desorptive component of 68 g/m² in terms of a solid was fixed. Characteristics of said sheet are as shown in Table 2. The saturated moisture absorptive ratio was as high as that of the starting moisture absorptive and desorptive ultrafine particles, the detaching ratio due to running water was not so large, and the product had a practically durable property.

Example 8

The moisture absorptive and desorptive sheet of the present invention was prepared by the same method as in Example 6 except that 1.8 parts of ethylene glycol diglycidyl ether was used. Characteristics of said sheet are as shown in Table 2. Thus, detaching ratio due to running water was very low and waterproof property was particularly excellent. However, probably due to the fact that a moisture absorptive and desorptive site was used for cross-linking, although its saturated moisture absorptive ratio was in a practically durable level, it was low as compared with that of the starting moisture absorptive and desorptive ultrafine particles.

Comparative Example 4

A moisture absorptive and desorptive sheet was prepared by the same method as in Example 6 except that the moisture absorptive and desorptive particles having a big particle size prepared in Example 3 were used. Characteristics of the resulting sheet were as shown in Table 2 and, although the saturated moisture absorptive ability was high, the detaching ratio due to running water was as very big as 76% whereby the result was that more than one half of the moisture absorptive and desorptive material was detached by water and waterproof property was insufficient. Accordingly, the product was unable to be practically used.

TABLE 2

|  |  |  | Example 6 | Example 7 | Example 8 | Comparative Example 4 |
|---|---|---|---|---|---|---|
| Saturated moisture absorptive ratio | 20° C. × 65% RH | [%] | 48 | 54 | 36 | 50 |
|  | 20° C. × 90% RH | [%] | 90 | 97 | 83 | 93 |
| Detaching ratio due to running water |  | [%] | 5 | 12 | 1 | 76 |

The invention claimed is:

1. Moisture absorptive and desorptive ultrafine particles, wherein the said particles consist of a cross-linked polymer containing 1.0 to 10.0 meq/g of a salt-type carboxyl group and 0.1 to 2.0 meq/g of the sulfonic acid group and/or salt-type sulfonic acid group as polar groups where an average primary particle size is not more than 0.1 μm and saturated moisture absorptive ratios at 65% RH and 90% RH at 20° C. are not less than 20% by weight and not less than 40% by weight, respectively.

2. The moisture absorptive and desorptive ultrafine particles according to claim 1, wherein the type of the salt of the carboxyl group or the type of the salt of both polar groups is a potassium type.

3. Moisture absorptive and desorptive sheet, wherein the moisture absorptive and desorptive ultrafine particles according to claim 1 are fixed to a substrate.

4. The moisture absorptive and desorptive sheet according to claim 3, wherein the ratio of the moisture absorptive and desorptive ultrafine particles in the fixed area on the substrate is more than 80% by weight.

5. The moisture absorptive and desorptive sheet according to claim 3, wherein the fixation has been carried out by a reaction of a cross-linking compound.

6. The moisture absorptive and desorptive sheet according to claim 3, wherein the fixation has been carried out by a polymerization of a polymerizing compound.

7. A moisture absorptive and desorptive element, wherein the moisture absorptive and desorptive sheet according to claim 3 is layered.

8. A humidifying/dehumidifying apparatus, which has the moisture absorptive and desorptive element according to claim 7 as one of the constituting elements.

* * * * *